United States Patent
Polastre et al.

(10) Patent No.: US 11,443,642 B2
(45) Date of Patent: Sep. 13, 2022

(54) SECURE MICROSERVICE ARCHITECTURE FOR UNMANNED AIR TRAFFIC MANAGEMENT

(71) Applicant: A^3 BY AIRBUS LLC, Sunnyvale, CA (US)

(72) Inventors: Joseph Polastre, San Francisco, CA (US); Karthik Balakrishnan, San Francisco, CA (US)

(73) Assignee: A^3 by Airbus LLC, Sunnyvale, CA (US)

( * ) Notice: Subject to any disclaimer, the term of this patent is extended or adjusted under 35 U.S.C. 154(b) by 345 days.

(21) Appl. No.: 16/499,744

(22) PCT Filed: Jun. 29, 2019

(86) PCT No.: PCT/US2019/040024
§ 371 (c)(1),
(2) Date: Sep. 30, 2019

(87) PCT Pub. No.: WO2021/002826
PCT Pub. Date: Jan. 7, 2021

(65) Prior Publication Data
US 2021/0366296 A1 Nov. 25, 2021

(51) Int. Cl.
*G08G 5/00* (2006.01)
*B64C 39/02* (2006.01)
(Continued)

(52) U.S. Cl.
CPC ......... *G08G 5/0043* (2013.01); *B64C 39/024* (2013.01); *G05D 1/0022* (2013.01);
(Continued)

(58) Field of Classification Search
CPC ................ G08G 5/0043; B64C 39/024; B64C 2201/12; B64C 2201/141; G05D 1/0022; G05D 1/102
See application file for complete search history.

(56) References Cited

U.S. PATENT DOCUMENTS

2008/0209506 A1 8/2008 Ghai et al.
2011/0099371 A1 4/2011 Roy et al.
(Continued)

OTHER PUBLICATIONS

International Search Report for PCT/US2019/040024, dated Nov. 20, 2019.

*Primary Examiner* — Peter D Nolan
*Assistant Examiner* — Roy Rhee
(74) *Attorney, Agent, or Firm* — Maynard Cooper & Gale, P.C.; Jon E. Holland, Esq.

(57) ABSTRACT

A platform for unmanned traffic management (UTM) may include a compute system and infrastructure that standardizes and controls aviation data transmitted between service providers, where each service is abstracted from the platform through a service wrapper that enforces the preset data standards. The service wrappers enforce restrictions on the performance and configuration of data from the service provider. The service wrappers are customized to respective services (such as tracking, terrain, or weather), but provide a standard point of interface, security, and trust between the platform and any services directed to provide a similar function. Upon the request of a user or service providers to obtain aviation data, the UTM platform selects a service providing that aviation data, and provides connection data to the user while protecting the security and integrity of the data. Computationally-intensive tasks that require data from supporting services can be bundled or grouped together as a single service with a service wrapper providing a single point of interface. Bundled services can be designed to as to maintain verifiability and/or safety-criticality of the data passed therethrough.

17 Claims, 5 Drawing Sheets

(51) Int. Cl.
  *G05D 1/00* (2006.01)
  *G05D 1/10* (2006.01)
(52) U.S. Cl.
  CPC .......... *G05D 1/102* (2013.01); *B64C 2201/12* (2013.01); *B64C 2201/141* (2013.01)

(56) References Cited

U.S. PATENT DOCUMENTS

| | | |
|---|---|---|
| 2013/0073419 A1 | 3/2013 | Marwedel et al. |
| 2015/0081896 A1 | 3/2015 | Richardson et al. |
| 2015/0230207 A1* | 8/2015 | Wang .................. H04W 40/12 348/143 |
| 2016/0093217 A1 | 3/2016 | Hale et al. |
| 2017/0162064 A1 | 6/2017 | Ubhi et al. |
| 2017/0187539 A1 | 6/2017 | Thompson et al. |
| 2018/0123967 A1 | 5/2018 | Kinarti et al. |
| 2018/0225651 A1* | 8/2018 | Stone .................. G06Q 20/382 |

* cited by examiner

SECURE MICROSERVICE ARCHITECTURE FOR UNMANNED AIR TRAFFIC MANAGEMENT

BACKGROUND

The complexity of air traffic management has increased as the availability and use of unmanned aircrafts rapidly grows. In addition to the extensive number of commercial and private manned air vehicles, unmanned aircrafts are, in many geographic areas, set to become increasingly present. For instance, drones, for hobby and commercial purposes (such as data collection and delivery), air taxis in the form of light planes, helicopters, electric vertical take-off and landing aircraft (e-VTOL), and the like, government drones and vehicles, and other commercial and private unmanned flights may share airspace with traditional manned aircraft, at high, medium, and/or low altitudes. In the same way that manned vehicles traditionally require air traffic control operations, future airspace management will need to address all of manned and unmanned traffic, as well as all of autonomous, partially autonomous, and/or non-autonomous solutions. Further, as the density of vehicles in the shared airspace increases, requirements for availability, speed, and reliability of air traffic solutions may change, with safety-critical functions like tracking, identification, and registration needing real-time response.

Air traffic management solutions require a structured way of managing air traffic to ensure safety, providing access to airspace without high hurdles, standardizing and optimizing solutions capable of being used across global or political boundaries, and providing scalability and flexibility for technological innovations that may occur in the future. Of particular importance are the safety, security, and comfort of the passengers, aircrafts, and cargo being transported, and of the people, resources, and property over which the aircrafts fly.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

Figure 1A:
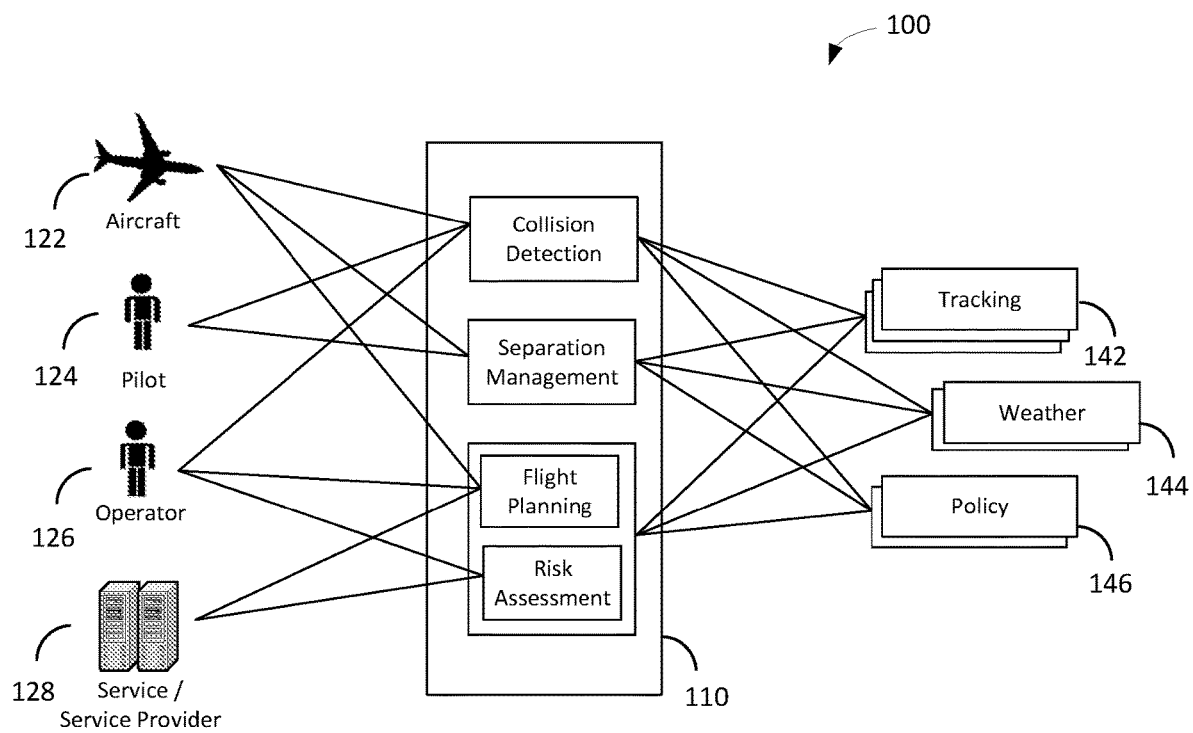
FIG. 1A illustrates a block diagram of a portion of an unmanned traffic management (UTM) system in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present disclosure generally pertains to systems and methods for unmanned traffic management (UTM) that allow for the setting of data standards on data passing through a UTM system and the standardization of data interfaces within the system. In addition, the present disclosure pertains to systems and methods for end-to-end enforcement of data and performance standards. In one embodiment, a plurality of independently-operated, single-function services referred to herein as microservices or micro-level services (such as, e.g., services capturing weather, flight tracking, or terrain data, among others) are available to users, each single-function service being contained within a unique service wrapper that allows for connection to a UTM platform. A service wrapper may be customized to a core service program enclosed therein, ensuring that the core service meets desired configuration and performance standards, and providing a standardized point of entry to the data provided by the core service, that is, a standardized interface for data exchange. A service wrapper may obtain respective capability benchmarks for a service core, and provide those benchmarks to the UTM platform. In response to a query by an end user (which may be another service or any other entity) for access to a type of data provided by a service, the platform may intelligently decide which of a plurality of services meets the necessary performance benchmarks or requested capabilities for the querying user and is therefore most appropriately used. The platform then connects the user to a controlled, standard point of entry at which the user can access information generated by a selected service that meets the query requirements. Service providers for similar services may compete with other providers by offering different capabilities, standards of performance, and/or prices, so as to meet different benchmark requirements.

In some embodiments, single-function services, each wrapped in a discrete service wrapper, may be grouped together under a service wrapper defining a macroservice or macro-level service (e.g., a service that provides commands for an aircraft or actionable information for a UTM system, such as flight planning or avoidance services). In some embodiments, a single-function service that provides more than raw data, such as those that provide an intelligent analysis, recommendation, approval, or other function beyond a "data dump" may additionally or alternately be considered a macro-level service. A macro-level service may be used to provide a single, standardized interface to access a macro-level (or high-level) UTM function.

In some embodiments, rather than subscribe to a single-function service, an end user may subscribe to a combination of two or more services that are certified together as a unit to meet, e.g., safety of life constraints or other required safety standards. In some embodiments, the UTM platform contains logical components capable of identifying which of several single-function services are necessary to the functioning of (or should otherwise be including with) a high-level UTM service, and coordinates the transmission of data between these component services in accordance with safety and performance standards.

In some embodiments, each of the micro-level services (single-function services) and the macro-level services (which may include one or more single-function services) may be logically independent from each other, or grouped together in one or more logical configurations. A service core (a base program written and/or provided by a service provider) for a service may be isolated from the platform through a predetermined API connection of the service wrapper. In some embodiments, a plurality of third party service providers may provide a similarly or identically-functional aviation service, that is, the service cores may collect/output/process the same type of data while performance, latency, accuracy, resolution, price, or other factors of different service cores may vary. Each of these similarly-functioned service cores is configured within a service wrapper that provides an identical entry point at which the service may "plug in" to the platform. A service core along with its encapsulating wrapper may be collectively understood as the service visible to and/or offered to an end user of (or other entity using) the UTM platform. By these means, even where any particular service fails, the platform may instead simply direct traffic to a similarly-functioned service so that a service failure does not cascade to users and/or other services relying on the output of the failed service.

In some embodiments, the service wrappers may use standardized APIs provided expressly by the platform such that the services are "infrastructure-independent" (in some embodiments, "cloud-independent"), capable of being connected to any similarly-configured underlying infrastructure without modification of the service wrapper or the service core therein. The platform may switch infrastructure services as appropriate or necessary, thereby selecting the best infrastructure service without requiring changes to the service wrappers or service core therein.

In some embodiments, the service wrappers may provide standardized APIs, such that the platform may require services fulfilling the same UTM function to provide the service's functionality the same APIs. By these means, the service wrappers offer modularity or interchangeability between services, allowing the platform to switch between the use of different core services to find the best or most appropriate service, while still offering to an end user consistency of connection and experience in using the functionality.

In some embodiments, whether or not a provided service is safely-critical, the platform, through the service wrapper, may enforce relevant safety-critical or security-critical compliance standards from end to end. For instance, in one embodiment, raw data received from a third-party-hosted service is authenticated through the use of predefined signatures and/or other cryptographic functions, among other methods, where the mechanisms of authentication are maintained (or added to) as data is transmitted over various computer systems/repositories. By these means, the platform may maintain a chain of custody over such data from entry into the UTM system until the data's ultimate transmission to an operator or decision-making entity. In some embodiments, transmission of data may be limited to computer systems and storage in repositories that have been certified as safety-critical. In some embodiments, the platform may be a computer bus that verifies the authenticity and reliability of safety-critical information, transmits that data to be stored in a safety-critical repository, prohibits or limits modification to the stored data, and limits access to the stored data to authorized or verified users and/or service providers.

By these means, while an end user interface may experience access to a monolithic or hard-coded UTM component, the end user may in fact access, through one interface, one or more top-level UTM services such as traffic management, where any of a plurality of microservices or top-level services (described in greater detail below) can be selected and their output provided to the user. This allows for greater flexibility in the sourcing and configuration of service options, for greater fault tolerance, and for more dynamic use of the platform by differently-configured unmanned vehicles, while services themselves remain wrapped in and subject to strict security and performance checkpoints. This configuration may address some of the unique security and regulatory challenges of aviation data, while maintaining the certification and configuration of service and infrastructure providers that have invested heavily in meeting such regulatory standards, and allowing for dynamic change and evolution in industry solutions.

FIG. 1A is a block diagram illustrating the use of an exemplary UTM system. The data that passes through the UTM system may be processed by one or several entities. In one embodiment, one or more end users 122-128 may interact with a UTM platform 110 to obtain aviation (or other) data from one or more third party services.

In some instances, an end user of the system may be vehicle, such as an unmanned aircraft 122, a hobbyist or commercial drone, a passenger aircraft (e.g., light planes and helicopters), a government drone or vehicle, or any other aircraft that is wholly or partially autonomous, that is, containing at least some autonomous components, or any component thereof. For ease of reference, all such vehicles may be referred to herein as unmanned aircraft or unmanned vehicles (or, in some cases, as vehicles), even if a human pilot is on board, so long as the vehicle is not subject (or is not entirely subject) to manned aircraft flight rules managed by traditional air traffic management services for the entire duration of flight. A vehicle subject to manned aircraft flight rules for only a portion (or multiple portions) of a flight may also be, in some embodiments, considered an unmanned vehicle. In an exemplary embodiment, an unmanned vehicle has, integral to the aircraft, at least one or more autonomous components, however other configurations are possible in different embodiments.

Some unmanned vehicles may have a pilot 124 (including humans and/or automated pilot functionalities) that controls the aircraft, sometimes remotely, and relies upon traffic management services to receive guidance on where and when to fly. Such pilots 124 may themselves be an end user of the UTM system, in some embodiments. One exemplary end user vehicle and/or pilot may seek services providing, e.g., in-flight instructions to maintain separation between aircraft or react to unforeseen conditions, to allow safe transit of the aircraft. In some embodiments, an unmanned vehicle may use the UTM system, where an unmanned vehicle may include, for example, piloted aircraft for which the pilot subscribes to advisory and/or information services, for example for increased safety or other goals.

End users 122 and 124 may in some embodiments, be encompassed by one or more Unmanned Aerial Systems (UAS), which term may be understood as an unmanned aerial vehicle (UAV) and any support systems for the UAV such as autonomous or human-operated control systems, as well as any communication or command system linking the two systems. In this regard, exemplary end users 122, 124 may include piloted aircraft in which autonomous functionalities are not incorporated integrally into the aircraft, but are instead provided by a separate mobile (or other) device. As one example, an implementation where a pilot uses, for instance, a mobile phone such an iPhone or Android device, an iPad or tablet device, a laptop, touchscreen device, or the like, in the piloting of the aircraft may be considered in some embodiments to be an unmanned vehicle.

Some manned or unmanned vehicles may have an operator 126 that plans and oversees a vehicle's "mission," which planning may include, for instance, the setting and filing of the vehicle's flight plan. An operator 126 may also act as an end user of the UTM system. The operator 126 may rely upon flight planning services to find the flight path they would like to use for their mission, submit a requested flight plan for regulatory compliance, assess risk, and the like.

The term "user" may be referred to herein to include any or all of the above-described end users, or a "user" within the UTM system 100. For example, in some embodiments, an entity interfacing with one or more services provided through the UTM system (or the platform to which those services connect, as described in greater detail below), may in fact be a particular UTM service (or a group of UTM services) of the UTM platform, or a service provider of those services (illustrated collectively or individually in FIG. 1A as service/service provider 128). For purposes of illustration, a flight authorization service may require data from one or more other services, such as a risk service, to output a flight authorization (or relevant data thereto). That risk service, in turn, may require data from one or more other services, such as current weather data, in order to output a risk assessment. Each of these exemplary services may be understood to "use" the UTM system 100 and the UTM services, and may therefore, in different embodiments, be considered an end user of the system.

Of course, these are just some of many possible end user types (which other users may include, for instance, government or other regulatory agencies, and/or service providers described further below), and other embodiments may include any number of users of any type. Accordingly, a "user" of the UTM system 100 may be any of the above-described humans, vehicles, computer systems or components, or any other appropriate entity or object.

The above-mentioned services require various kinds of data to inform their decisions, such as weather, air traffic surveillance and flight tracking, regional policy settings, and/or terrain, among other things, and in such embodiments, these services are therefore facilitated through analysis of data provided by one or more service providers 142-146. Service providers may provide single-function information and/or services (such as traffic management services) that provide raw, aggregated, and/or analyzed data to the UTM platform 110. In one embodiment, each service provider 142-146 outputs a set of raw data corresponding to, e.g., information about weather conditions or vehicle flight tracks, sensor or GPS readings, terrain information, historical flight path data, or other data. In an exemplary embodiment, this output data may be real-time data that is relatively static in scope, facilitating, e.g., a "data dump" or a set of unanalyzed data that can be used by services of varying complexity. In some embodiments, a service provider may take in a query or request and facilitate a responsive service or recommendation, such as, e.g., an emergency response, weather forecasting, policy analysis, or communication with regulatory or governmental agencies, among many other things. As just one example, a service may be provided that aggregates raw sensor data from radar, video, 3G/LTE/5G, ADS-B, satellite, and/or other sources to create a comprehensive set of real-time data showing objects sensed in the airspace around a vehicle.

Figure 1B:
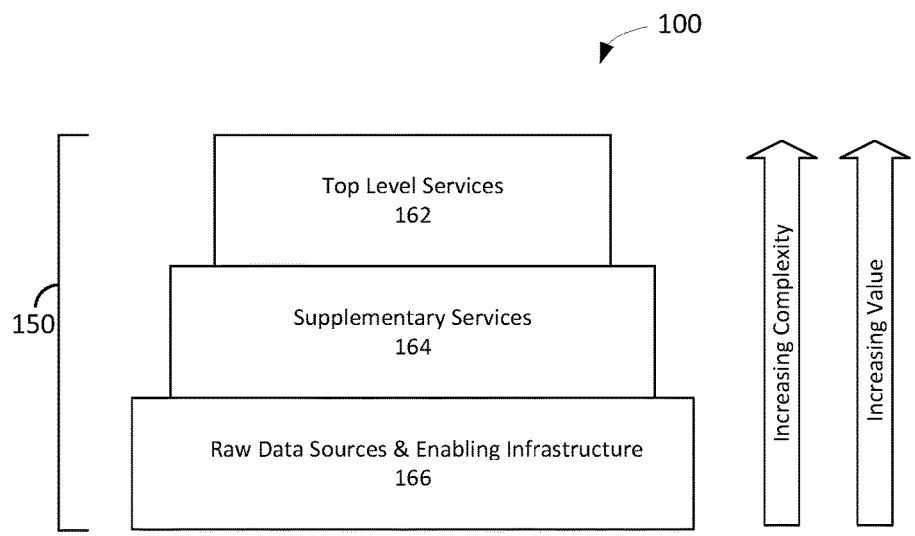
FIG. 1B illustrates a conceptual design of a UTM system in accordance with some embodiments of the present disclosure.

These single-function services provided by various service providers may be understood as microservices or micro-level services, which may vary in their complexity. A microservice may be understood as a single-function service that provides raw data, such as, e.g., services capturing weather, flight tracking, or terrain data, among other things. These microservices, taken together with other, higher-level functions and supportive infrastructure, comprehensively provide the functionality of the UTM system. Within the UTM system, top-level, highly-complex services taken in raw data from microservices to provide commands or actionable data to the end users 122-126. These top-level services may be understood as macroservices or macro-level services. For purposes of illustration, FIG. 1B shows a conceptual design of a UTM system 100 in accordance with some embodiments of the present disclosure. As illustrated, the system is built from conceptual layers of information 162-166, arranged from bottom to top in order of increasing complexity and increasing value to the end user (e.g., comparatively more intelligent analysis or recommendations). Bottom layer 166 may include raw data source (e.g., microservices) and enabling infrastructure, viz., basic inputs from sensors (for instance, wind speed measurement) and/or the infrastructure building blocks for different services (for instance, cell towers used in the transmission/receipt of data). Supplementary services 164 may use data collected from these raw data sources, transforming the raw data into a form usable by different services, by data analysis, processing, transform, or the like. As just one illustrative example, a supplementary service 164 may use raw data from radar, cell, and ADS-B surveillance sources, and may output comprehensive or aggregated position data of all aircraft. This transformed, usable data generated by the supplemental services 164, and in some cases the raw data itself, can be used by top-level services 162 (e.g., macroservices), such as deconfliction, fairness, emergency response, and many others, to provide actionable guidance or commends to end users (vehicles, operators, regulators, pilots, other UTM services or service providers, etc.).

For purposes of illustration, a tactical deconfliction service may be a top-level service that requires the reconciliation and analysis of many supplemental services and data sources. The tactical deconfliction service may rely on, among other things, a real-time tracking supplemental service and a microweather supplemental service. The real-time tracking service may in turn rely on raw data from RADAR, ADS-B, and Remote Identification systems. Accordingly, a pyramid 150 of increasingly-complex services may be provided and used within the UTM system. Other embodiments are of course not limited to the illustration of FIG. 1B, and in various embodiments, any number of type of service may be used in a variety of configurations.

As one illustrative example, with reference to FIG. 1A, an operator 126 of an aircraft may need access to a flight planning/risk assessment service and collision detection services, a service or service provider 128 may need access to a flight planning/risk assessment service, a pilot 124 may need access to collision detection services and separation management services, and an aircraft 122 may need, for example, access to collision detection services, separation management services, and flight planning services. Such services (illustrated to be accessible through the UTM platform 110) are examples of top level services. Other such top-level services may include, for example, landing assistance services, tracking, traffic information, strategic or tactical deconfliction, corridor control, or geo-fencing, among many other things. These macroservices may, in some embodiments, rely upon data collected from at least one microservice. The collision detection service of FIG. 1A, for example, is shown to rely upon all of tracking data 142, weather data 144, and policy data 146. In the illustrated embodiment of FIG. 1A, the end users may access a UTM platform 110 at a single, standardized point of entry, while the actual architecture of the platform 110 allows for distributed performance of different services by different entities, and the consolidation of data output by such services into a single comprehensive macroservice by a central platform.

It will be understood of course that the list of services above is merely exemplary, and is not intended to be an exhaustive list of services or data that would facilitate or assist in UTM services. A service provider may, in some embodiments, provide just one (or several) of many services, and a given type of service may be provided by multiple providers. FIG. 1A, for example, illustrates three instances of a flight tracking service 142 (that is, three service providers providing such a service), two instances of a weather service 144, and two instances of a policy service 146, though of course other embodiments may be differently configured such that the number and types of services and/or service providers are not so limited. In one embodiment, each service provider 142-146 will be duly licensed in accordance with all regulatory requirements, if applicable, though in other embodiments, varying levels of licensing may apply. In one embodiment, a service provider contributing data that may be used by safety-critical systems may transmit, to the UTM system, information (such as a cryptographic key) passed along with the data and verifying the source, integrity, and/or veracity of the data provided, among other data needed to maintain safety.

Figure 2A:
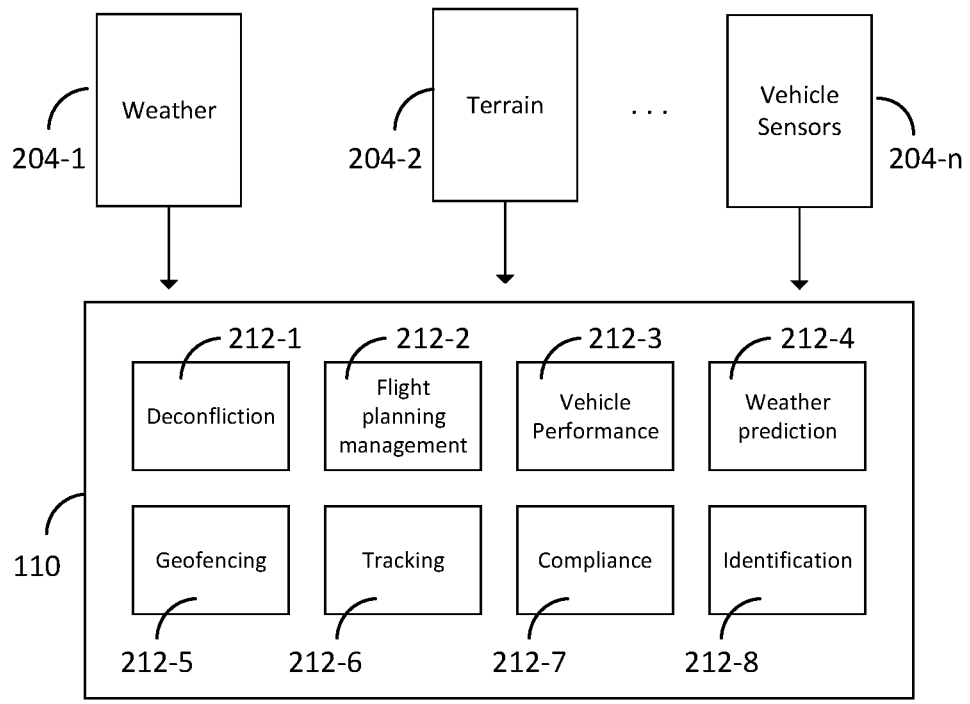
FIG. 2A illustrates select components of a UTM system in accordance with some embodiments of the present disclosure.
Figure 2B:
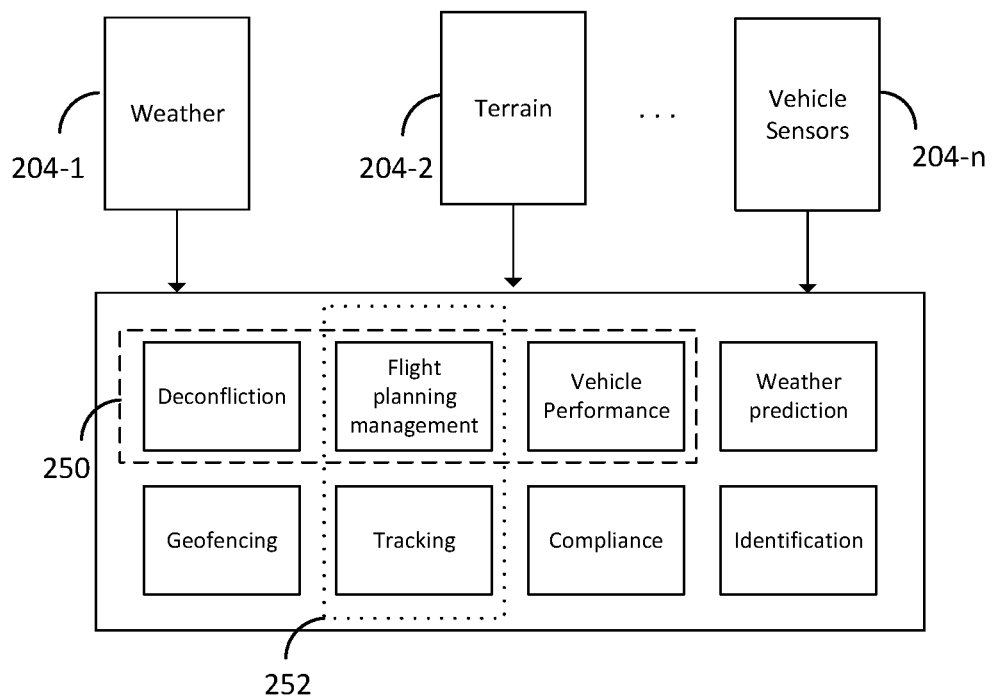
FIG. 2B illustrates select components of UTM system in accordance with some embodiments of the present disclosure.

FIGS. 2A and 2B illustrate the general principles of one embodiment of the system 100 including a UTM platform 110 into which one or more services connect. In an exemplary embodiment, platform 110 functions in a manner similar to an app store, in the sense that a user of the platform 110 (such as, e.g., the operator or pilot of an aircraft, a component of an aircraft, a service provider operating on the platform, another UTM service, or another entity) may search for particular services or information to facilitate a desired function, e.g., a traffic management. The platform 110 makes available various services to users (as defined above with regard to FIG. 1A, e.g., vehicles, pilots, operators, one or more UASs, UTM services, service providers, regulators, etc.), to support vehicle management, traversal through the airspace, and various capabilities. This is done by connecting one or more data-providing software routines (services) to the platform 110, each of those services being encompassed by a service wrapper as it plugs into the platform. That is, the platform 110 coordinates the activities of various services implemented by providers. These services are various and extensive in their scope. At a micro-level, services are typically single-function or low computation, such as obtaining real-time weather (204-1) or terrain (204-2) data, or vehicle sensor information (204-n), and the like. In addition, the platform 110 may offer access to more intelligent, computation-heavy services, for instance, supplemental services like, e.g., tracking services (tracking what is in the airspace), or highly-complex management-level macroservices the functionalities of which would, in a manned aircraft, typically be performed by a human-led air traffic management component. Macro-level services may include, for instance, flight planning (e.g., helping operator plan details of the flight) or traffic management services (e.g., filing and approving flight plans, strategic in-flight management (e.g., capacity management, collision avoidance, traffic information (flight support), risk assessment), vehicle-to-vehicle/vehicle-to-infrastructure services for navigation and landing, calculation of collision risk (e.g., based on location, altitude, time of day), determining general airspace usage metrics, flow management and congestion control, and other air traffic management services). In circumstances where regulatory agencies (most commonly, for instance, government agencies like the FAA or national Air Navigation Service Providers) or local authorities have set policies for a particular airspace (e.g., altitude limits on particular vehicles, local no-fly zones, risk sensitivity, etc.) and requirements for policy compliance, one or more compliance-targeted services may ensure compliance with such regulations, and the like. In addition, one or more services may coordinate with existing ATM systems and their controllers in order to coordinate with manned aviation traffic. The lists above of microservices and macroservices are not intended to be exhaustive, but instead are simply illustrative and different platforms in different embodiments may be differently configured.

The illustrated UTM system 100 of FIG. 2A contains a platform 110 from which various UTM services are available. For instance, FIG. 2A illustrates components facilitating UTM services for deconfliction (212-1), flight planning management (212-2), vehicle performance (212-3), weather prediction (212-4), geo-fencing (212-5), tracking (212-6), compliance (212-7), and identification (212-8) (collectively, components 212), though any number and configuration of services may be provided in different embodiments. The components 212 depicted within the platform 110 may be, in some embodiments, connection/service endpoints, defined by service wrappers, for the services 204. The service wrappers (described in greater detail below) provide connections between the end users of the platform and one or more service cores that include logic implementing a basic functioning of the service(s). In that manner, components 212 may be thought of as "service offerings" of the UTM system for services made available through the platform 110. For ease of reference, "service offerings" may also be referred to herein as "services," though in the exemplary embodiment, the execution of certain services may be delegated to specialized service providers rather than being implemented directly by the platform 110 (or the computing systems thereof) and only the resulting data transmitted through the platform. The services 204 need not be in a strictly 1:1 correspondence with the service offerings 212, rather, the platform 110 may define different logical sets of wrappers to provide a variety of services based on data from one or more third party service providers.

FIG. 2A shows an exemplary set of services contained within the UTM system 100, respectively labeled as 204-1 through 204-n. Such services are generally low-level services that provide datasets (e.g., raw data) upon which more computation-heavy, and/or intelligent analysis can be conducted. However, in some embodiments, services 204 need not solely act as a data dump, but instead may function as advisory services, providing, for example, an answer to a relatively computationally-simple query.

In some embodiments, services 204 (which support UTM service offerings 212) are created and implemented by third parties, however in some embodiments, one or more of services 204 (or portions thereof) may be implemented by the platform provider and/or may use computing resources of the computing systems used in the provision of platform 110. UTM service offerings 212 may correspond to the top-level services that provide commands or actionable data to the users of that service, and may respectively rely on data from one or more of microservices 204-1 through 204-*n*. In other embodiments, UTM service offerings 212 connected to a platform 110 may include a mix of top-level UTM services and microservices. By these means, end users of the platform 110 may variously be able to access data from a third-party service regarding terrain or commands from a high-level collision avoidance service, a computation heavy task.

In some embodiments, further to the example described above with reference to FIG. 1A, a user connecting to the UTM system 110 may be a service provider for any of the services 212. A service provider may be a commercial or non-commercial entity that may provide data or resources that implement traffic management and/or information services that make up the system, which services might in turn need data from an information service. Put another way, some of these top-level services may rely upon the output of other microservices. For instance, a deconfliction service offering 212-1 may require data about current weather conditions (service 204-1) and/or terrain (204-2). A collision avoidance service offering (not specifically shown in FIG. 2B) may consider, e.g., that same weather and terrain information, along with vehicle condition information (204-*n*). Of course it will be understood that these are just examples for purposes of explanation, and that any combination of services may be grouped together as is appropriate.

These top-level services may be combined into logical blocks to offer high-level UTM services for air traffic management. For instance, with reference to FIG. 2B, services for deconfliction, flight planning management, and/or vehicle performance may all be relevant to a flight planning service 250. Similarly, flight planning management and tracking abilities may be relevant to a corridor control service 252 that provides guidance for vehicles taking off, landing, or traversing airspace corridors. Each of services 250 and 252 may be contained within individual service wrappers to allow for respective points of interface thereto. These types of high-level traffic management services may be combined by the platform 110 or, in some embodiments, at the request of users and/or regulatory bodies, to manage flights of collections of vehicles. In some embodiments, a platform 110 provides an authoritative service to coordinate aircraft traffic, for example under the auspices of government regulatory agencies, from which its authority to coordinate derives. Some or all of the services 212 (FIG. 2A) support those traffic management services, such support services, including, e.g., the above-mentioned weather information, tracking, and registration services, and/or many others.

Figure 3A:
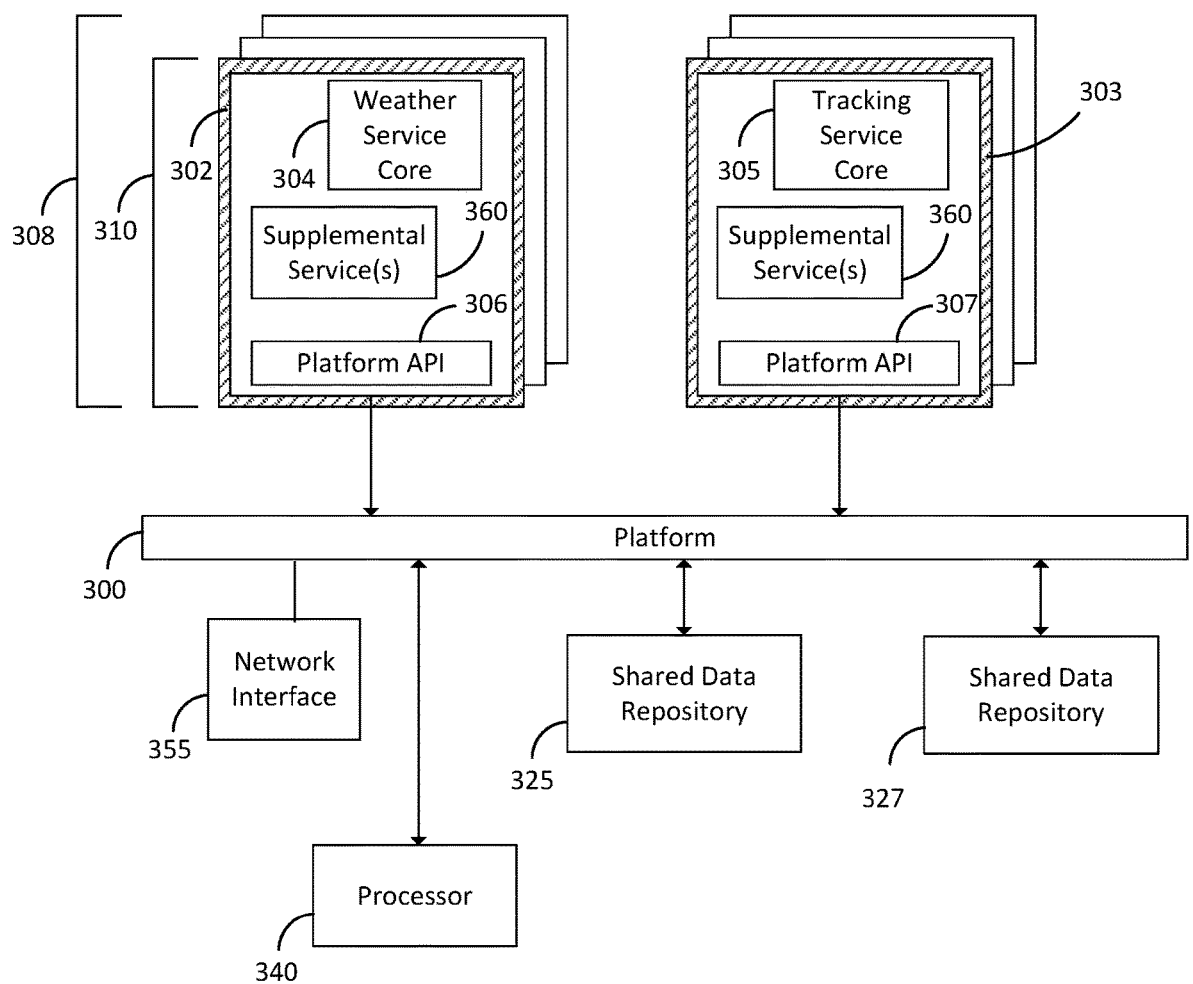
FIG. 3A illustrates an architecture of a UTM system accordance with some embodiments of the present disclosure.

FIG. 3A illustrates components of an exemplary implementation of a service on a platform 300. FIG. 3A illustrates a number of service cores 304, 305, each representing a main logic of a service (each of which may be, for instance, any micro- or macro-level service as described above) provided by a service provider. Each service core 304, 305 is contained within (or encapsulated by) a respective service wrapper 302, 303. Service wrapper 302 may be understood as an interface between a provided service core 304 and the platform 300. In some embodiments, service 302 may also act as an interface between a user interface (component 362 in FIG. 3B) and any service running on the platform 300. Service wrapper 302, 303 (including any components of the wrapper, described in greater detail below and with reference to FIG. 3B) along with the encapsulated service core 304, 305 (i.e., the service core and any supplemental services, described below), and any other APIs or other components encapsulated by the respective service wrapper, may be comprehensively referred to herein as a service object or service 310. In other embodiments, multiple service cores may be contained within a single service wrapper 302, for example in the case of complex or macro-level services, such as services 250 and/or 252 in FIG. 2B.

Service wrapper 302 standardizes communication from the platform to the service core (and vice versa) without requiring the modification of any source code of the service core 304 itself. In some embodiments, the wrapper 302 may be specifically configured to the service core. That is, in some embodiments, any wrapper 302 is uniquely customized to the service core encapsulated therein, even as the wrapper outwardly standardizes the data and/or points of connection to the platform 300 (and, in some cases, to one or more users of the platform). In some embodiments, the wrapper 302 may be customized to the encapsulated service core, while containing one or more standardized components, such as, e.g., platform connectivity helpers, authentication helpers, role assignment helpers (to facilitate obtaining credentials to different resources) and the like. These various helper components are illustrated collectively as supplemental services 360. Supplemental services 360 may in different embodiments, use some or all of various helper components, services necessary for platform-based activities, such as the discovery and analysis of service capabilities and characteristics, data processing/analysis, management related to communication standardization, identity or authentication capabilities, and the like. The service wrapper 302 is embedded in the platform 300, however, the service core 304 itself is not so embedded, instead being facilitated by an associated third-party service provider. Other configurations are possible in other embodiments, for example where wrapper 302 is not uniquely customized, but instead may be standardized or otherwise configured to the needs of the service 310.

In one embodiment, a wrapper 302, 303 may provide one or more standardized application programming interfaces (APIs) 306, 307 for communication with the platform 300, though any number of other tools to communicate with different systems may be used in different embodiments. While the description herein may refer to wrapper 302, it may be generally understood that in an exemplary embodiment, the same general structures/functions may apply to any other service wrapper including wrapper 303. In this regard, wrapper 302 is designed, in one embodiment, to enforce a standard input and/or output interface (e.g., a standard port number, protocol, and/or API) for communication between the service core 304 and the platform 300. By these means, wrapper 302 provides a layer of abstraction for the service core 304, so that the service core becomes a portable solution that can be easily referenced (that is, moved) from any similarly configured cloud platform 300, even where the service core 304 itself is hard-coded or otherwise cloud-specific. The services (whether micro- or macro-level) may therefore be infrastructure-independent, capable of being connected to any similarly configured platform without modifying the service wrapper or the service core therein. The platform may switch out service providers for different services, providing modularity of service within the UTM system.

With reference to the embodiment of FIG. 2B, a wrapper 302 may be provided for each individual service 212, and also for each logical block of services 250, 252. The services bundled in blocks 250, 252 may be jointly coordinated to provide a highly-intelligent and/or computationally-heavy air traffic management service. The wrapper 302 may maintain identical data and performance standards within all services necessary for the higher-level service 250 (e.g., flight planning). In addition, each smaller service within the wrapped service 250 may have a similar or identical interface for the service 250. Users of the platform 300 may therefore navigate blocks of distributed services through a single point of interface, and in a manner similar to other, simpler services. Services may therefore be bundled into logical blocks each with a single point of entry, in a manner that is invisible to the requesting user/entity. In some embodiments, wrapper 302 is customized to the service core 304 so as to ensure verification of the service (whether the output of the service is meeting its specified requirements), configuration of the service, and/or service performance (e.g., bandwidth/latency, and other connection issues). The wrapper 302 enforces constraints, set by the platform 300 on the data output by the service core 304, so that the data conforms, for example, to a particular format and type, and follows standardized communication protocols. In an exemplary embodiment, the constraints are predetermined, set by safety and/or regulatory standards. In other embodiments, the constraints may be determined by the platform 300, for example based on predetermined settings, a comparison or aggregation of other constraints met by other (or similar) services, or any other appropriate basis. In some embodiments, the wrapper 302 may include one or more standardized service interfaces (typically implemented as APIs) to enforce constraints on the format, type, and/or standardization of data.

In some embodiments, the wrapper 302 may additionally or alternately include one or more verification interfaces (e.g., APIs) (shown in FIG. 3B) to verify that the data output by the service core 302 meets or exceeds any agreed-upon or advertised service standards or service metrics. In some embodiments, such metrics may include, for instance, one or more of: data performance (e.g., speed and/or accuracy), range, or geographic specialization, granularly of data, availability of the service (e.g., 24 hours or 99.99% availability), error bounds on the data provided, or information about the service provider (such as any certification they may have, or the price of their service), though any other appropriate metric of service performance, accuracy, or compliance to platform-mandated standards may be applied in various embodiments. Such verification interfaces may be used, in different embodiments, periodically or cyclically (for example at predetermined intervals or in accordance with a predetermined schedule), continuously, upon the occurrence of an event (such as a service or platform upgrade, a recognized software or hardware error or tamper attempt, the addition or availability of a new service or provider), upon the request of an end user, service provider, UTM service, or the platform, or at any appropriate time.

As one illustrative example, a weather service provider (providing weather data) may advertise that it provides data with a 500 m resolution. The service wrapper 302 encapsulating the weather service core 304 of that weather service provider may, via one or more verification interfaces, may request data from the weather service core 304, and may analyze the received data to determine whether the advertised data resolution is satisfied. The platform 300 may request the wrapper's verification APIs to watch the data over time (that is, periodically query over a set period of time), and use the resultant data to check that the service is meeting the advertised resolution, providing accurate or consistent forecasts, or any other appropriate metric of service. In some embodiments, the service wrapper 302 may provide audit capabilities allowing the platform 300 to verify what actions have occurred that are brokered by the service wrapper 302 (such actions including in some embodiments, the disconnecting, connecting, querying and/or auditing or services, or other appropriate logged actions). In other embodiments, a service core 304, or the associated service provider, may self-report to the platform 300, via wrapper 302, that the service core 304 is out of compliance with the advertised service requirements, without the platform 300 or the service wrapper 302 performing a comparative or query-based analysis.

In a case that the service provider does not meet the specified service requirements, the service wrapper 302 may determine that the service is deficient or is in violation, and may (temporarily or permanently) disconnect the service 310 from the platform 300. In other embodiments, where the service provider does not meet the specified service requirements, the service wrapper may allow the service 304 to remain connected to the platform 300, but may limit or restrict access to that service. For instance, in an embodiment where the performance of the service has degraded, there may still be end users for whom a reduced performance/functionality is sufficient. In some embodiments, the service wrapper 302 may indicate such reduction in service to the platform 300 (for example through a flag or another indicator) and may allow the platform to connect less discriminating end users to the service. In some embodiments, the platform 300 may present an opt-in confirmation to the end user before making accessible a service with degraded or limited performance, though other embodiments may not require such confirmation.

In addition, the service wrapper 302 may be configured to determine capabilities of the encapsulated service core. For instance, for a weather service, the service wrapper 302 may determine the range at which weather conditions may be sensed, the speed at which the data can be provided, any latency issues, and the like. In one embodiment, this determination may be done by polling one or more encapsulated service cores 304. In addition, service wrapper 302 may be aware of any characteristics specific to the encapsulated service, such as its cost of use. These types of information may be unique to each service provider and/or each provided service.

Platform 300 is an interface between the services 310 provided thereon and one or more users 122-126 or services that seek air traffic management services or supporting data. With reference to FIG. 3A, in some embodiments, the platform 300 may be thought of as a bus that services 310 may use to drop data onto so that other services can access it. The platform 300 is therefore in a position to receive a query from a user or service for access to particular data, to discover what services and/or providers provide such data, and to provide a point of connection to an appropriate service provider. For instance, if a service seeks weather information, the platform may direct it to a weather service to be used. Alternatively, any of several other weather services may be available (collectively identified in FIG. 3A as weather services 308).

There is no limit on the number of potential service providers, and in some embodiments, dozens or hundreds of service providers may provide the same type of weather service core 304 (or other service). Service providers may, for example, distinguish themselves based on price, performance (e.g., speed), range, geographic specialization, and/or any other appropriate distinguishing point. By these means, increasingly innovative and better performing service providers may join the market, reducing barriers to entry. In some instances, local or federal regulatory bodies may require certification of services or otherwise limit the number of service providers that may operate within a given area, and such limitations may be taken into consideration when defining a limit on available services 308, if any.

The platform 300 has access to the particular capabilities of each service encompassed by a wrapper 302, so as to understand who provides the service, what data and performance is provided, etc. The platform 300 may then, in response to a user request, discover specific service providers that provide the requested service, select a service from the set of discovered service providers based on the particular capabilities thereof, and redirect a user to the appropriate service API endpoint 306, 307 for the selected service. Endpoints 306 are, in an exemplary embodiment, standardized across all the providers of a particular service (or type of service), such that transition between different providers, if necessary, does not impact (or minimally impacts) the end user of the platform. As one example, if one weather service provider (or one service object 310) of the available providers 308 (or available services) fails, another provider (or service object 310) may be available and the platform may simply redirect the user's traffic to another appropriate service 310 associated with the replacement provider (or service). Further, because the service cores 304 are, in the exemplary embodiment, isolated and abstracted from the platform 300, changes to the platform 300, the supporting structures, and/or the code of the service core 304 itself are invisible and/or non- or minimally-impactful to the other components of the system 100.

Figure 3B:
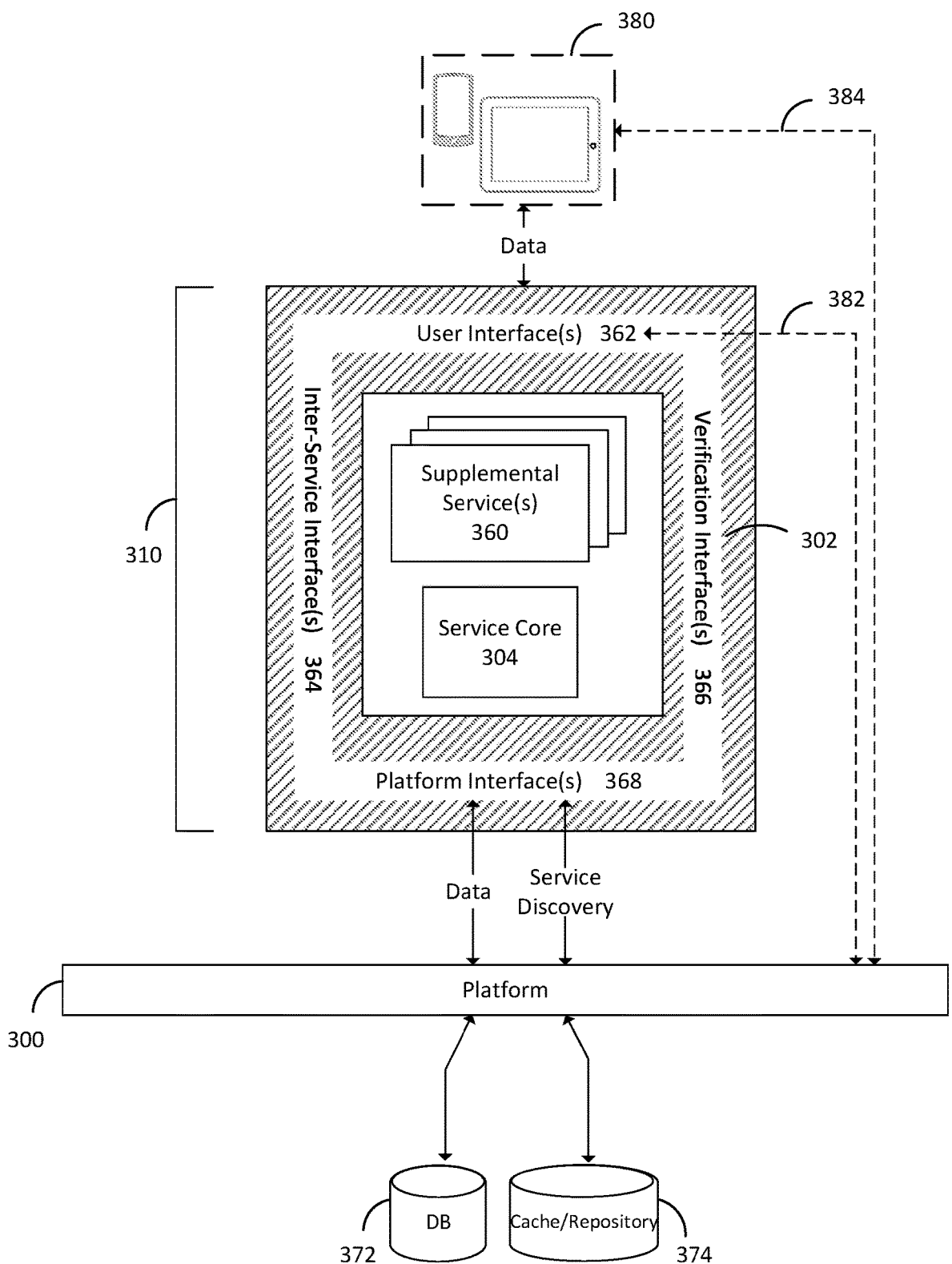
FIG. 3B illustrates an architecture of a UTM system accordance with some embodiments of the present disclosure.

One example embodiment is described herein with reference to FIG. 3B. A user 380, such as a computer system of an aircraft, a mobile phone such an iPhone or Android device, an iPad, tablet, or touchscreen device, a laptop, PC, or other computer system, or the like, or a human interacting with any of the above devices, may seek access to a service via platform 300. As described above, the service core 304 provides the main logic of a requested service (which may be, e.g., a tracking service). In an exemplary embodiment, the service core 304 may be created and provided by the associated service provider, typically a third party to the platform 300. Service core 304 is enveloped by a service wrapper 302 that provides multiple types of interfaces, such as: user interface(s) 362, inter-service interface(s) 364, verification interface(s) 366, and platform interface(s) 368. Each of user interface(s) 362, inter-service interface(s) 364, verification interface(s) 366, and platform interface(s) 368 may include one or more standardized APIs or other tools/toolkits.

Platform interface 366 allows for access from the service wrapper 302 to the services offered by the platform 300, and vice versa. In an exemplary embodiment, all transmission between the platform 300 and the service core 304 occurs through the platform interfaces 368, including transmission of data (such as to one or more databases 372, 374 and/or other platform infrastructure) and transmission of communication relating to service discovery, described in greater detail below. However, other embodiments may exist where data may be transmitted indirectly to/from the platform 300 via another component of the UTM system, e.g., through another service wrapper via one or more inter-service interfaces 364. In some embodiments, service wrapper 302 may encompass one or more supplemental services 360 (which may include, as described above, standardized helper components providing platform connectivity, authentication, role assignment functions, and the like, and/or one or more services such as services necessary for platform-based activities, such as the discovery and analysis of service capabilities and characteristics, data processing/analysis, management related to communication standardization, and the like. In embodiments where the user 380 requests to receive data from the service, platform 300 may route or redirect user 380 to a user interface 362, for example by providing the user with a predetermined, standardized port number or other standard connection information. The platform 300 may also provide access between service core 304 and other services via the inter-service interface 364, and may provide additional functionalities directed to the standardization and management of the service data, in a manner described further below. Verification interfaces 366 may be used as described above to query compliance status (such as a certification status or performance metrics indicating compliance against predefined/agreed-upon criteria usually required for safety or set by standards), allowing the service wrapper 304 and/or platform 300 to automatically verify the compliance of a service's logic 304 or a service provider. In other embodiments, user interface 362 may communicate directly with the platform 300, as illustrated by dotted line 382. In still other embodiments, a user 380 may communicate directly with a platform 300 (without interaction with user interface 362) through one or more platform-specific user interfaces (not specifically shown), in a manner illustrated by dotted line 384.

Figure 4:
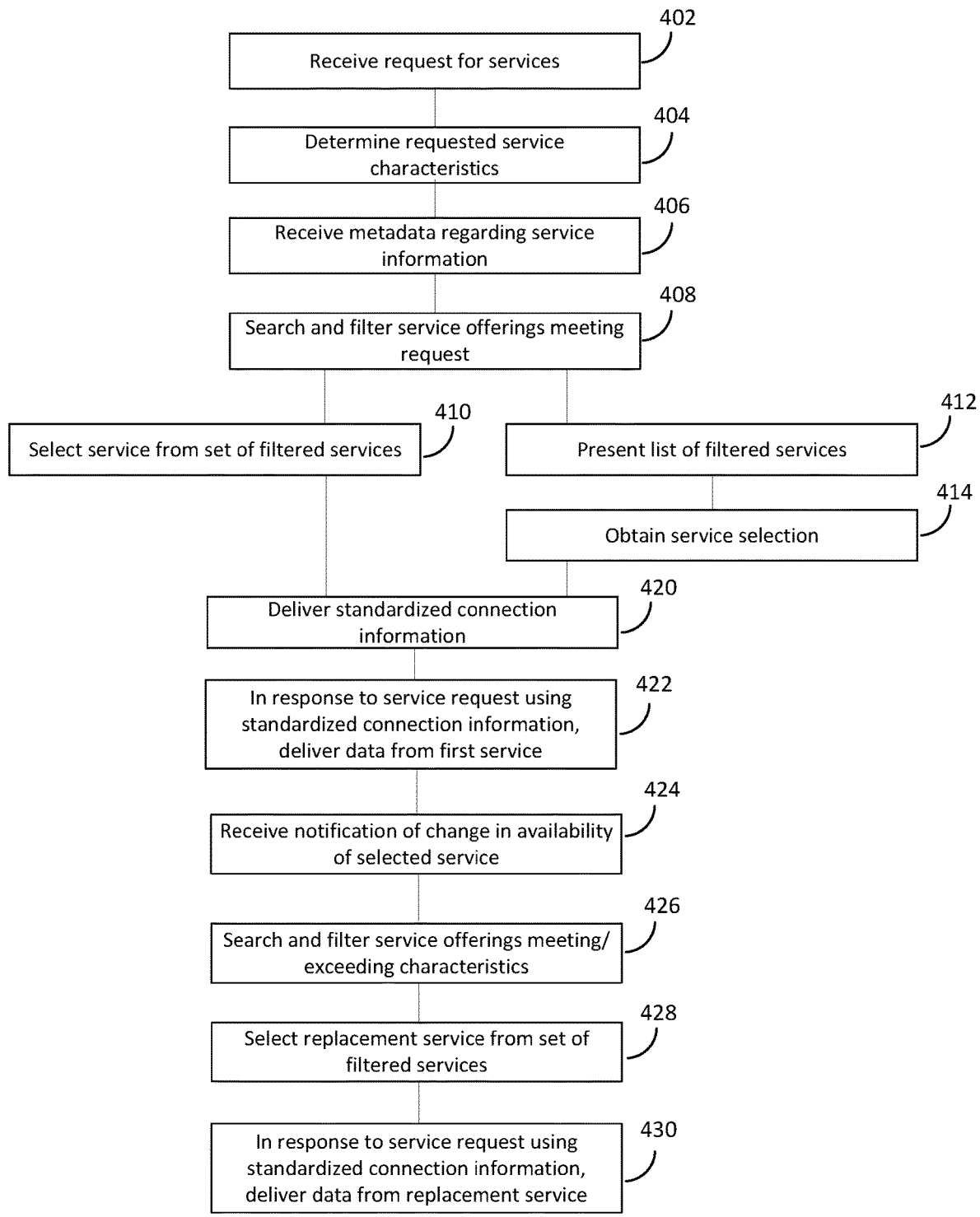
FIG. 4 is a flow chart of a method for obtaining data from an aviation service provider via a UTM platform in accordance with some embodiments of the present disclosure.

FIG. 4 depicts a flow chart of an exemplary process by the platform responding to a user's (or other entity's) request for a service via the platform 300. Regarding the processes 402-430, while the various steps, blocks, or sub-processes are presented in a given order, alternative embodiments can perform routines having steps, or employ systems having steps, blocks or sub-processes, in a different order, and some steps, sub-processes, or blocks can be deleted, moved, added, subdivided, combined, and/or otherwise modified to provide alternative or sub-combinations. Each of these steps, blocks, or sub-processes can be implemented in a variety of different ways. Also, while steps, sub-processes, or blocks are at times shown as being performed in series, some steps, sub-processes or blocks can instead be performed in parallel or in a distributed manner, or can be performed at different times as will be recognized by a person of ordinary skill in the art. Further, any specific numbers noted herein are only examples; alternative implementations can employ differing values, ranges, or components.

The process begins at Step 402, at which the platform receives a request from the user, who may be, e.g., a controller, pilot, aircraft or component thereof, air traffic management service, UTM service, and/or service provider, a device used by any of the foregoing, or any other entity capable of interacting (and in some embodiments authorized to interact) with the platform 300. In some embodiments, the user may not be familiar with the service providers that are available to provide the requested service, and instead may limit his request to a defined service (or set of services), or a type or characteristic of the data, recommendation, or instruction that is needed from the service.

The specification of these services, or types and/or characteristics of service data, may be done, for instance, through a manual entry of service requirement data, entry through a graphical user interface, or any other appropriate means of input. In one embodiment, the user may specify a required service level (or service characteristics) of performance or operation, which required characteristics are received (or, in some embodiments actively obtained) by the platform 300 in Step 404. These required performance characteristics may include, for example, a minimally-acceptable speed (e.g., 5 seconds), distance (e.g., 100 m or 1 km), or geographic region at which data may be obtained, though other conditions, such as a name of a particular service provider or organization, may be used in different embodiments. In other embodiments, the user need not expressly input or define any service characteristics, and instead, the platform 300 may recognize appropriate service characteristics from the request itself. As one example, the platform 300 may, from geographic information associated with the user's location (e.g., from GPS or sensor data, IP address, user profile data, or the like), determine an appropriate geographic region at which data should be obtained, and may use such information to determine one or more requested service characteristics. Other information may be similarly obtained, based on, e.g., information about the user, the user's data connection the type of aircraft, the user's flight plan, etc. In some such implementations, the platform 300 does not discriminate between users to provide higher or lower levels of service requirements to different types of users, but rather may obtain information or make inferences from user information to determine a minimum required level of service, in circumstances where the user does not expressly provide such information, however, other implementations may be possible in other embodiments. In another embodiment, the user may be a member of an organization, and the platform 300 may determine requested service characteristics from organizational standards, or from the requests of other users under the same organizational umbrella. In yet another embodiment, the platform 300 may use predetermined or default service characteristics in place of the requested service characteristics, for example average or best/highest service levels.

Each service wrapper 302 may, for the service associated with the wrapper, expose the characteristics of the service outward to the rest of the platform 300. It will of course be understood that the services need not be limited to third-party services, but may also include micro- or macro-level services, bundled service offers, and/or lower or higher-level services, which service's data may be sourced from third parties or generated, in whole or in part, by logic contained by the platform 300 or computer systems associated therewith. The platform receives the service characteristics from those services from their respective service wrappers in Step 406. In one embodiment, the platform, upon receipt of the user's request, transmits a request to the service wrappers to provide this information. In other embodiments, the service wrappers may provide information periodically, upon connection of the service to the platform via the service wrapper, or upon request of the user, platform, or other component(s), and the platform may store information exposed by the service wrapper in a memory 325, 327.

The information exposed by the service wrapper 302 may, in the exemplary embodiment, be limited to information points (also referred to herein as "metadata") about the service, so as to not involve exposure of actual aviation data from the service itself. In some embodiments, the information may include, e.g., a data type of the data provided by the service (e.g., weather data, sensor data, flight plan data, deconfliction data, data provided by any of services 204 or service offerings 212), or any appropriate data. In some cases, one service may provide more than one type of data (e.g., real-time weather data and predicted weather data), in which case the service wrapper may provide multiple information points relating to data type. In still other embodiments, the user may request data that is not expressly provided by one service, but instead requires analysis and/or processing of data collected from two or more services. For instance, where the user is seeking a high-level service such as flight planning, a macro-level service wrapper (e.g., service wrapper 250 in FIG. 2B, encapsulating multiples services 212-1, 212-2, and 212-6) may provide metadata for the requested type of service. In other embodiments, in response to the user's query (for, e.g., a flight planning service), a service 310 could search for and/or poll one or more other similar-level services (i.e., a microservice could poll another microservice) for metadata to determine which services are capable of supplying all or part of the data necessary to complete the user's request.

In addition, the service information exposed by the service wrapper may include information about the service levels or service characteristics enforced by the service wrapper on the data (tin an exemplary embodiment, aviation-related data, though other types of data, such as weather data, may be accessed that, while relevant to the analysis of aviation services, are not necessarily or by definition weather-related) that will be supplied by the service. This service characteristic information may include, for example, performance (e.g., speed and/or accuracy), range, geographic specialization, granularly of data, the availability of the service (e.g., 24 hours), error bounds on the data provided, information about the service provider (such as any certification they may have, or the price of their service), and/or any other appropriate distinguishing point. To put it another way, any or all of these pieces of information (or any subset thereof) may be thought of as metrics about a service, such as performance metrics.

In some embodiments, the service wrapper 302 may collect metadata about a service and/or its performance through information supplied by a service provider at the time that the service and/or the service wrapper 302 were configured for connection to the platform 300. In other embodiments, the service wrapper 302 may determine one or more service characteristics through measurements taken from the transmission from the service provider and/or logic contained in the verification interfaces 366. As an illustrative example, interfaces 366 of service wrapper 302 may measure the speed at which data is sent from the service provider (or from another service) through any known means, such as a measurement of latency (round trip time), or may determine a type of data through comparison of the data provided by the service to known types of aviation data. Similarly, in various embodiments, interfaces 366 may be capable of determining other types of information through their own application of logic.

The platform 300 may then analyze the characteristics of each service, in some embodiments performing a search thereon (Step 408). The analysis may, in some embodiments, include a two-part determination. First, the platform may consider the type of service, specified in the information or metadata provided by the service wrapper of that service, to identify which, of the plurality of available services 310, provides the type of data requested by the user. Second, of that subset of services 310 that provides the correct type of data, the platform may look at the service metrics provided by the associated service wrappers to determine which, if any services, meet or exceed the service characteristics or service level requested by the user. In some embodiments, the platform 300, through each of these determinations, progressively filters the available set of services to smaller subsets that satisfy the user request, ultimately reaching a filtered set of services that all satisfy the user's required service criteria. In still other embodiments, a request from a user may identify a set of services for consideration, or one or more characteristics/criteria from which a set of services can be identified. The platform may analyze service metrics of the identified set of services first (or, in some embodiments, preferentially or in exclusivity) to determine whether those services satisfy the user's required service criteria. The process of confirming that a service meets customer's user requirements may be understood generally as validation of the service or a validation of service performance against a user query.

In some embodiments, the platform may also include, in the filtered subset, services 310 for which the service characteristics/service level is close to the requested level, or within a predetermined degree of difference, such that the data provided by the service may still be of use to the user. This embodiment may be most useful where the user's requests are extensively limiting and/or there are relatively few services providing the type of data requested by the user, or the user may not be able to otherwise find an ideal service (though, in some embodiments, an exact or ideal match may be found). In still other embodiments, the platform may perform a search for a service that maps each prospective service to the user's required service criteria, distinguishing the services based on their increasing degree of difference (for example, through a ranking, grouping, ranged value comparison, or the like), to determine which of the considered services is the closest, or least different, to the user's required criteria.

The platform 300 may then select a service 310 from the filtered set of services, and may provide connection information to the user, or may redirect the user to that service, in response to the user request (Step 410). In some embodiments, the platform may select the first service it finds that meets the criteria (or comes sufficiently close to the criteria) specified in the user request. Such an embodiment may be particularly useful in a case that the platform's service discovery process is compute-constrained or time-constrained, as the discovery process may stop after the first matching service is found. In other embodiments, the platform may select a service that is the "best" service, for example with the best performance, speed, granularly of data, or another appropriate measure, from among the set of services that meet the criteria specified in the user request. In still other embodiments, the platform 300 may analyze the set of services that meet (or come sufficiently close) to the criteria of the user request, and may select the service that is closed thereto based on any number of heuristics or measure, to find a "best match." For instance, a best match selection may involve the assignment of a score based on a similarly between the characteristics of a service and the characteristics of the user request. In another alternate embodiment, the selection of the service by the platform may be randomized, applied in a round robin manner among those services that meet the relevant criteria, selected based on one or more criteria (e.g., most available compute time, fastest to respond, cheapest, etc.), or selected based on any other appropriate method. The platform 300 may also apply any combination or subset of the techniques above, where appropriate (e.g., the fastest of otherwise equally "best" matching services). Some such implementations may involve an association of the service scores and/or the "best match" with information sufficient to identify the user (such as an ID, a login/password, and IP address, a MAC address or other unique hardware ID, or the like), in a memory accessible to the platform 300, so that the user can later be connected to the same service. After selection, the platform 300 may deliver standardized connection information for that service (or the service wrapper) to the user (Step 420) and then securely connect the user to the service/service wrapper (or supply connection information to the user) and deliver data from the service over the connection to the user (Step 422).

In an alternate scenario, rather than select a service itself, the platform 300 may present all (or a subset of) available service options to a user (e.g., as a list with metadata about the service's capabilities and performance), and allow the user to select an appropriate or desired service for the provided options (Steps 412, 414). Such an embodiment may be most useful where, e.g., none of the available services meet the user's requested standard of performance, or where the deficiencies between the options as compared to the user requirements are relatively equal.

In the exemplary embodiment, in a case where the selected service somehow becomes unavailable, the platform determines the service no longer meets verification requirements, the platform automatically detects a failure, or, in some instances, receives notice of such a change from a service provider (Step 424), or in some embodiments, from a user where the service (or service provider) is no longer meeting a desired or public or published set of specifications. Unavailability may be due, e.g., to mechanical error (e.g., failure or unreliability of sensor(s) or other hardware) or latency in data transfer, loss of certification by the service provider, or any other relevant reason. Upon becoming aware of the unavailability, platform 300 may, without prompting by the user, search for and find a replacement service meeting the same (or sufficiently similar) queried service characteristics, or exceeding those characteristics (Steps 426 and 428). In other embodiments, in the platform 300 may take such actions in response to a user prompt/request.

The platform 300 thereafter begins connecting the user with the replacement service (Step 430). This change in service provider may in an exemplary embodiment be invisible (or near invisible) to the user, as the connection protocols and point of interface for the original and replacement selected services are identical. Alternatively, platform 300 may notify user 380 of the change, or in some cases may transmit a query to user 380 to provide authorization to switch to the replacement service. Seeking authorization may be most beneficial in circumstances where the replacement service differs substantially in areas that may be noticeable to the user, such as in performance, scope of data provided, and/or cost.

As one illustrative example, where 100 total services 310 are available through the platform 300, a user may request predictive weather data within a southwest region of the United States. The platform 300 may obtain metadata from the 100 service wrappers respectively associated with each of the 100 total services, to determine which of the 100 services are capable of supplying predictive weather data. For exemplary purposes, if 10 services of those 100 total services provide such data, platform 300 may filter the set of services responsive to the user's query to 10 services. Next, of those 10 services, the platform 300 may consider which services provide data regional to a southwestern portion of the United States. For exemplary purposes, where one service provides predictive weather data over a global region, two services provide predictive weather data comprehensive to the United States, and one service provides predictive weather data specific to the southwestern United States (and where the remaining five services do not provide data regarding the southwestern United States), the platform 300 has found five services of the original 100 services that satisfy the user's request. The platform may then select one of those five services, for instance the service providing predictive weather data specific to the southwestern United States, as such is closest to the user's request and may be considered a "best match". The platform 300 may then store (in a memory) an association between the user and the selected service and may connect the user to the service wrapper encapsulating the selected service. For example, the platform 300 may provide a connection port to the user to connect to the service wrapper. If, at a later time, the selected service becomes unavailable, the platform 300 may then select another service of the five services that satisfy the user's request, for example, a service providing predictive weather data comprehensive to the United States, and may store an association between the user and the newly-selected service. The platform need not provide an updated connection port to the user; rather, the connection information for each service wrapper is standardized, such as that the reconfiguration to the new service is invisible to the user. This, of course, is just one example implementation, and other methods of implementation may be possible in different embodiments.

As can be seen by the exemplary method of FIG. 4, the platform 300 anonymizes (or relatively anonymizes) air traffic management services (and their supporting services) to their capabilities rather than to their respective sources. End users may select certain buckets of service criteria that they wish to be satisfied. The platform contains sufficient logic to find a service (or a group or set of services) meeting the user's provided requirements, and to allow from selection from found services. That is, in an exemplary embodiment, an organization or user seeking, e.g., a weather service, may not favor a particular weather service or provider, and instead may simply provide the platform with a set of required service capabilities or boundaries. These may include, in one embodiment, information such as a speed of response, a bandwidth amount, or cost. By way of example, a tracking service may compete with other tracking services on the distance at which tracking is performed, bandwidth, and/or price, among other things, rather than merely on name recognition or institutional preference.

In some embodiments, particular bundled services 250 may require data sources and/or supplemental services to function to set standards, such as high bandwidth and low latency, high integrity, and/or reliable standards for security and/or availability. Therefore, platform 300 may in some instances select a service provider based wholly or partially on the performance standards of the provided service. This is particularly important for services 250 where each routing decision may involve a distributed computation and coordination amongst multiple services, or where real-time data is needed (e.g., for collision detection).

In some embodiments, as a result of the anonymizing effected by the platform, a service provider may not have information about the ultimate recipient of its service's data, and therefore, the service provider cannot favor (through quality or speed of service, for example) a particular customer or type of aircraft. Accordingly, a relative fairness of access is provided to different vehicles for any particular service type.

Turning again to FIG. 3A, processing of data over platform 300 may be implemented via one or more processors 340. The processors 340 may include any of a central processing unit (CPU), a digital signal processor (DSP), a graphics processing unit (GPU), an FPGA, an ASIC, or other types of processing hardware, or any combination thereof. Further, the processor 340 may include any number of processing units to provide faster processing speeds and/or redundancy, such processors being local or geographically distributed, or any combination thereof. Platform 300 may also have access to one or more shared memories or data repositories, shown in FIG. 3A as shared data repositories 325 and 327, and in FIG. 3B as databases 372 and 374. Such database repositories/databases may be, e.g., a cache, database, other data structure or any suitable type of repository. Memories 325, 237, 372, 374 may be any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor 340. In some instances, both or a subset of memories 325, 327 may be safety-of-life certified, though other configurations are possible in other embodiments. In addition, one or more of memories 325, 327, 372, 374 may store instructions or logic for implementing the functions of the platform 300, which logic may be implemented in hardware, software, firmware, or any combination thereof. Further, the network interface 355 (e.g., ports or pins) may interface components of the platform 300 with other computing components or systems.

An example embodiment where a risk assessment service may wish to update its risk assessment based on tracking data is described with reference to FIG. 3B. The risk assessment service may submit a query to the platform 300. Platform 300 may find (e.g., by reference to data stored in a memory or by query to one or more service wrappers) a service provider that provides a tracking service that meets the service requirements set forth in the query, and may route the risk assessment service to the inter-service interface 364 (which may include one or more APIs) of the tracking service. In another embodiment, platform 300 may store tracking data in a database 372 (which may be, e.g., a shared cache). The platform may, upon the request for the risk assessment service, access the tracking data from service wrapper 302 via platform interface 366, and store the tracking data in the shared cache 372. The platform 300 may then provide access to the shared cache 372 to the risk assessment service. Such an embodiment may be particularly useful when data is safety-critical and may need to be stored in a data repository meeting certification standards.

More particularly, certain services, and the communications between them, have additional requirements that depend on how critical they are to flight safety. For instance, aircraft tracking services may have requirements on the accuracy and the security of the data provided, the service's availability, the speed of response, and/or prescribed error bounds. The communication channel(s) between that tracking service and a traffic management server may have requirements on the security of the data in transit, the bandwidth available, and the availability of the channel(s), etc. Typically, service providers working with highly-critical systems (or the data that support it) may be subject to regulatory or certification to obtain a license for their services. A regulatory agency may set requirements to ensure that the service is implemented in a satisfactory manner (while maintaining, e.g., the functionality of the airspace and policy considerations), and may audit such implementation. These requirements impact security and reliability of the service, and therefore, directly affect the safety of the vehicles in flight and the people and property flying therein. The licensing may also be needed to ensure that critical services can interoperate correctly and reliably with other service instances.

A service wrapper, together with platform 300, may also function to ensure certification and/or regulatory requirements are met. For instance, wrapper 302 for a bundled service 250 (FIG. 2B) may enforce the same verification, configuration, and performance standards as do the respective wrappers for all of the bundled sub-services 212. In one embodiment, platform 300 may intelligently select already-certified services, from a range of service providers, to form cohesive bundled services that are certifiable. In other embodiments, the wrappers 302 may maintain compliance and/or authentication of individual services through registration and identification of micro-services. For instance, wrappers 302 may enforce that a safety-critical service provides, e.g., a way to contact a responsible party for verification, information, audit, enforcement, etc. The intelligence of the platform 300 and the enforcement of the wrapper 302 may therefore function together to maintain performance and certifiable aspects of a bundled air traffic management service. In either scenario, in the exemplary embodiment, a bundled service 250 may be safety certified as a whole.

In another embodiment, the services providing the raw or supplemental data for safety-critical services may not themselves be safety-critical. However in such embodiments, the platform 300 itself may be certifiable as safety-critical, and the wrapper 302 may ensure that the data from the non-certified services is nonetheless sufficient to meet safety-critical certification standards. For instance, platform 300 may maintain one or more safety-critical data stores (e.g., memory 325), and/or one or more appropriate cryptographic standards for communication over the related systems. In some embodiments, platform 300 may manage data stores and local and network interfaces abstractly, so as to control their performance, security, and the like.

By maintaining data and communications abstractions that are specific to safety-critical aviation data (i.e., geospatial data), safety-critical certification is not lost as data passes through the UTM platform. By these means, the platform 300 and the wrapper(s) 302 provide safety-critical functionality beyond those of a traditional cloud-based infrastructure. Accordingly, a distributed end-to-end compliance may be maintained.

In some instances, the platform 300 may function to maintain a chain of custody of data from the data source, thereby ensuring its authenticity and/or veracity even where the data may be transmitted over less secure or untrusted networks. More particularly, some embodiments may involve the use of a cryptographic key or signature associated with the hardware device collecting particular data (such as sensor data) to authenticate that the source of the data is trusted and that the collected data is accurate. Platform 300 may, in some embodiments, continue to associate the key or signature with the data at all points of movement of the data through its computer systems. This data may be stored in one or more data stores (e.g., memory 327), which need not necessarily be certified as safety-critical. By verifying that the key or signature remains unmodified or otherwise contains its original signatures, platform 300 may confirm that the data has not been tampered with, modified without authorization, or otherwise altered (e.g., through software or system failure, or an unforeseen event)—(that is, platform 300 ensures that the integrity of the data has been maintained. In some embodiments, verified interface 366 (FIG. 3B) of a service wrapper 302 may function to perform validation or verification of data, ensuring that the services provides the type, format, and standard of data they purport to. In addition, in some embodiments, verified interface 366 may enforce standards for accuracy (e.g., errors bounds within which the provided data will fall) and/or performance (e.g., the speed/bandwidth/latency at which the data is provided). In the exemplary embodiment, it may be understood that in order to operate on platform 300, a service provider agrees to conform to certain data and performance standards. Service wrapper 302, through its validation and verification interfaces, measures the quality of the data and its conformance with the required platform standards.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for use in an air traffic management system, the method comprising:
    communicating, by a server with a plurality of service wrappers respectively associated with a plurality of external services, each service of the plurality of services having a core for providing aviation-related data, wherein the core is encapsulated by the associated service wrapper for providing an interface between the core and the server;
    determining, by each of the plurality of service wrappers, service metrics for the service associated with the respective service wrapper based on the aviation-related data provided by the core of the service associated with the respective service wrapper, wherein each of the service metrics indicates a performance of the service associated with the respective service wrapper;
    obtaining, by a server, data for each respective service of the plurality of external services, the data comprising (a) metadata indicative of a data type for the respective service and (b) service metrics determined by the service wrapper for the respective service;
    storing, by the server, the data in memory;
    receiving, by the server from a remote device, a request for data, the request including information indicative of a requested type of data and at least one requested performance requirement for a service;
    identifying, by the server, based on the respective metadata and the respective service metrics of each of the plurality of external services, one or more external services of the plurality of external services that output the requested type of data and that satisfy the at least one requested performance requirement;
    selecting, by the server, from the one or more external services, a service for responding to the request, wherein the selecting is performed based on the service metrics for the selected service; and providing, by the server to the remote device, in response to the request from the remote device, communication information sufficient to identify an interface via which the remote device can receive data from the selected service.

2. The method of claim 1, wherein the request from the remote device is a request for geospatial data.

3. The method of claim 1, further comprising:
verifying, for each external service of the plurality of external services, a certification status of a service provider associated with the service.

4. The method of claim 1, wherein the obtaining of data for each respective service of the plurality of external services comprises:
identifying that a source of the obtained data is a trusted source;
identifying that the obtained data has not been tampered with.

5. The method of claim 1, wherein the request from the remote device is a request for aviation-related data, and
wherein the at least one requested performance requirement for a service is one of: a speed or timeliness at which the service can provide aviation-related data to the remote device, a distance range for aviation-related data provided by the service, a geographic specialization for the aviation-related data provided by the service, a minimum data accuracy requirement, or a price associated with the aviation-related data provided by the service.

6. A method performed by an air traffic management system comprising a server, and a plurality of service wrappers respectively associated with a plurality of services, each service having a core for providing aviation-related data, wherein the core is encapsulated by the associated service wrapper for providing an interface between the core and the server, the method comprising:
receiving, by the server, from a user, a request for aviation-related data;
obtaining, by the server, from the request, a requested type of aviation related data and a requested first service characteristic;
requesting, by the server, from each of the plurality of service wrappers, in response to the request for aviation-related data, service information of a service associated with a service wrapper;
determining, by each of the plurality of service wrappers, service metrics for the service associated with the respective service wrapper based on the aviation-related data provided by the core of the service associated with the respective service wrapper, wherein each of the service metrics indicates a performance of the service associated with the respective service wrapper;
obtaining, by the server, from each of the plurality of service wrappers, the requested service information for the service associated with the respective service wrapper, the service information comprising a service type and the service metrics determined by the service wrapper for the service associated with the respective service wrapper;
identifying, by the server based on the requested service information, from the plurality of services, one or more services having a service type corresponding to the requested type of aviation-related data;
identifying, by the server, from the one or more services having the service type corresponding to the requested type of aviation-related data, one or more services having service metrics that satisfy the requested first service characteristic;
selecting, by the server, a service from the one or more services having service metrics that satisfy the requested first service characteristic;
providing to the user, by the server, connection information for connecting to the service wrapper associated with the selected service; and
storing, by the server, in a memory, an association between the user and the service wrapper associated with the selected service.

7. The method of claim 6, wherein the connection information provided to the user for connecting to the service wrapper associated with the selected service is a connection port.

8. The method of claim 6, wherein the connection information provided to the user for connecting to the service wrapper associated with the selected service is identical to connection information for connecting, by the user, to a service wrapper associated with another service of the one or more services having a service type corresponding to the requested type of aviation-related data.

9. The method of claim 6, wherein the requested first service characteristic is a speed at which the selected service can provide the requested aviation-related data to the user.

10. The method of claim 6, wherein the requested first service characteristic is a geographic region for which the selected service can provide the requested aviation-related data to the user.

11. The method of claim 6, wherein the requested first service characteristic is a compliance verification of the selected service.

12. The method of claim 11, wherein the compliance verification is one of: (a) an indication that the selected service meets a certification status, (b) an indication that the selected service meets a predetermined data standard, (c) an indication that the selected service meets a predetermined data range, or (d) an indication that the selected service meets a predetermined performance criteria.

13. The method of claim 6, wherein the requested first service characteristic is a latency measurement associated with the selected service.

14. The method of claim 6, further comprising:
obtaining, by the server, from a memory, a second service characteristic;
transmitting, by the server to each of the plurality of service wrappers, the second service characteristic;
in response to the requesting by the server for service information of a service associated with a service wrapper, (a) determining, by each of the plurality of service wrappers, whether the service associated with the respective service wrapper satisfies the second service characteristic, and (b) in a case that the service associated with the respective service wrapper does satisfy the second service characteristic, transmitting to the server, by the respective service wrapper, service information for the associated service.

15. The method of claim 6, wherein the determining comprises measuring, by the service wrapper, at least one of the service metrics for the service associated with the service wrapper based on the aviation-related data provided by the core of the service associated with the service wrapper.

16. An air traffic management system, comprising:
a first service wrapper configured to encapsulate a core of a first service for providing an interface between the core of the first service and a server, the first service wrapper configured to determine first service metrics for the first service based on aviation-related data provided by the core of the first service, wherein each of the first service metrics indicates a performance of the first service; and a second service wrapper configured to encapsulate a core of a second service for providing an interface between the core of the second service and the server, the second service wrapper configured to determine second service metrics for the second service based on aviation-related data provided by the core of the second service, wherein each of the second service metrics indicates a performance of the second service; and the server configured to receive, from a user, a request for aviation-related data, wherein the server, in response to the request, is configured to (1) obtain from the first service wrapper first service information comprising a service type for the first service and the first service metrics and (2) obtain from the second service wrapper second service information comprising a service type for the second service and the second service metrics, wherein the server is configured to determine, based on the first service information and the second service information, (1) whether the service type for the first service and the service type for the second service respectively correspond to a type of aviation-related data requested by the request from the user and (2) whether the first service metrics and the second service metrics respectively satisfy a service characteristic indicated by the request from the user, and wherein the server is configured to provide, to the user, connection information for connecting to one of the first service and the second service based on (1) whether the service type for the first service and the service type for the second service respectively correspond to the type of aviation-related data requested by the request from the user and (2) whether the first service metrics and the second service metrics respectively satisfy the service characteristic indicated by the request from the user.

17. The air traffic management system of claim 16, wherein the first service wrapper is configured to measure at least one of the first service metrics based on the aviation-related data provided by the core of the first service.

\* \* \* \* \*